Sept. 17, 1929.          B. COE          1,728,228
ANIMAL TRAP
Filed April 19, 1928     2 Sheets-Sheet 2
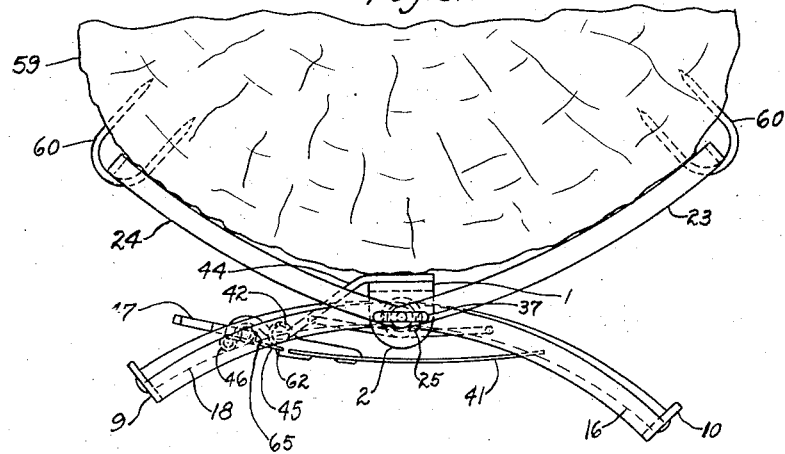
INVENTOR.
Bert Coe
BY
George B. Ingersoll
ATTORNEY.

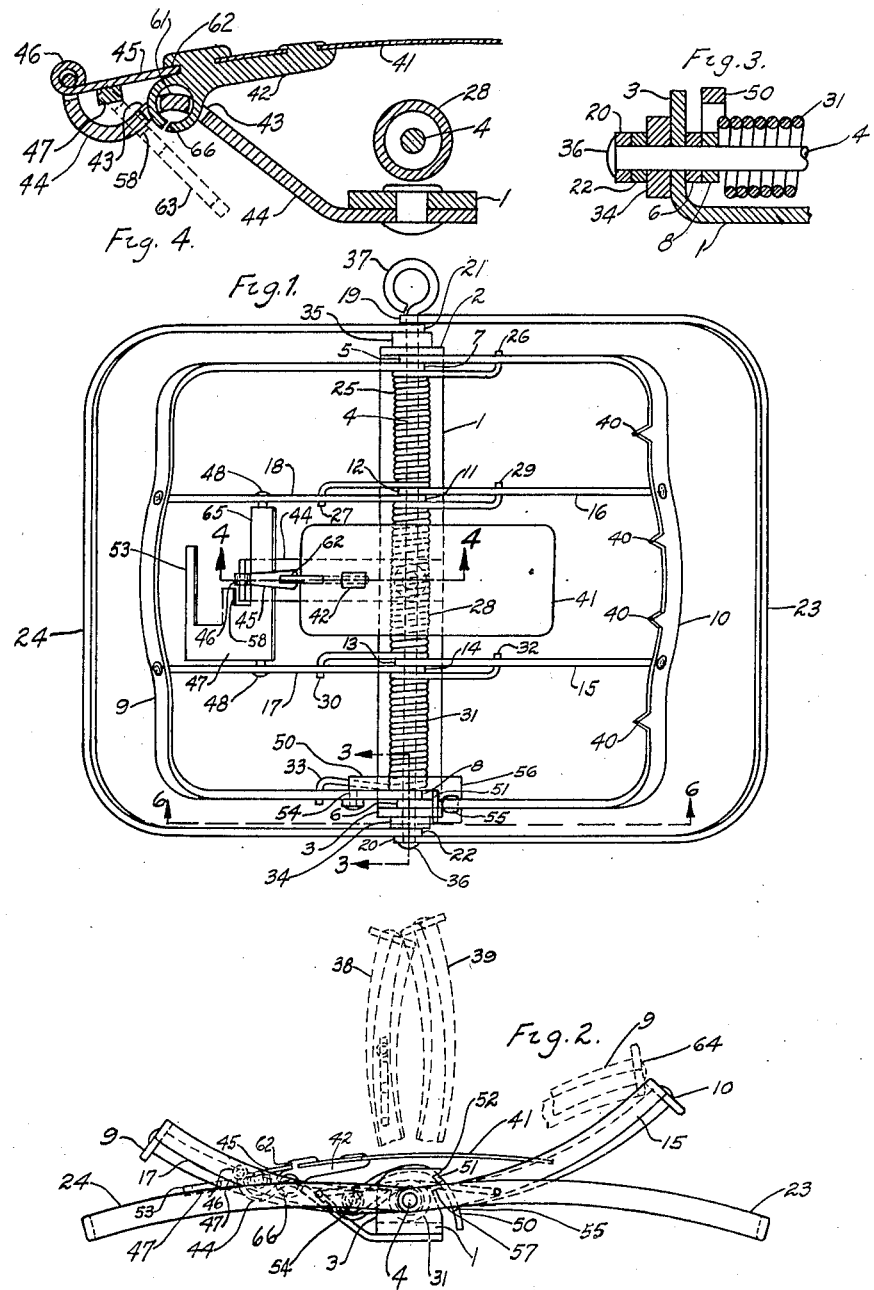

Patented Sept. 17, 1929

1,728,228

UNITED STATES PATENT OFFICE

BERT COE, OF FARMINGTON, MICHIGAN

ANIMAL TRAP

Application filed April 19, 1928. Serial No. 271,204.

My invention relates to improvements in animal traps having jaws operated by springs; and the objects of my invention are, first, to provide an animal trap having a treadle and its operating mechanism located entirely within the area of its jaws when in a set position; second, to provide a trap having body grip jaws that can be adjustably set for game of different sizes; third, to provide a trap having jaws with reinforcing arms; fourth, to provide a trap having a combined safety lock and trigger operating member; fifth, to provide a trap having a main jaw having a maximum closing travel of approximately 180°; sixth, to provide a trap having means for supporting same in horizontal, vertical, oblique, angular, or inverted positions; and seventh, to provide a trap having a treadle mechanism that does not contact with the jaws in a set position.

I attain these objects by the mechanism illustrated in the accompanying drawing, in which—

Figure 1 is a plan view of the entire trap in a set position; Fig. 2, an end view of the trap in a set position; Fig. 3, a sectional view on the line 3—3, Fig. 1; Fig. 4, a sectional view of the treadle and its operating mechanism on the line 4—4, Fig. 1; Fig. 5, a plan view of the trap set in a vertical position on the side of a tree; Fig. 6, a sectional end view of the adjusting arm, with the jaws in a full spread position, on line 6—6, Fig. 1; Fig. 7, a sectional end view of the adjusting arm, in a partial spread position, with the jaws indicated in a resultant position, on line 6—6, Fig. 1; Fig. 8, an end view of the trap with its jaws in an adjusted position together with the treadle mechanism; Fig. 9, an enlarged view of the treadle mechanism with the trigger operating member in a vertical position; Fig. 10, a side view of the adjusting arm; Fig. 11, a plan view of adjusting arm; Fig. 12, a plan view of the trigger operating member; Fig. 13, an end view of the trigger operating member; and Fig. 14, a view of the trap in an inverted position.

Similar numerals refer to similar parts throughout the several views.

The base plate 1 has turned up ends 2 and 3 through which extends the bolt or shaft 4. The shaft 4 also extends through the inner ends 5, 6, 7, and 8 of the jaws 9 and 10, as well as the inner ends 11, 12, 13 and 14 of the reinforcing arms 15, 16, 17, and 18. The arms 15, 16, 17, and 18 have their respective outer ends riveted to the jaws 9 and 10. The shaft 4 also extends through the inner ends 19, 20, 21, and 22 of the support members 23 and 24. It is to be noted that the supporting member 23 is of a longer length than the member 24. This allows the member to be revolved on the shaft 4 around the complete trap mechanism including the member 24. The coil spring 25 telescopes over the shaft 4 and has one tangential extension 26 anchored through the side arm of the jaw 10 and its other tangential extension 27 anchored through the reinforcing arm 18. The coil spring 28 telescopes over the shaft 4 and has one tangential extension 29 anchored through the reinforcing arm 16 and its tangential extension 30 through the reinforcing arm 17. The coil spring 31 telescopes over the shaft 4 and has one tangential extension 32 anchored through the reinforcing arm 15 and its other tangential extension 33 through the side arm of the jaw 9. A spacer 34 is interposed between the end 22 of the support member 24 and the end 3 of the plate 1 and a similar spacer 35 is interposed between the end 21 of the support member 24 and the end 2 of the plate 1 to give operating clearances. The shaft 4 may be riveted over at one end as at 36 and its other end may be formed into an eye 37 for attaching an anchoring chain. The coil springs 25, 28, and 31 tend to always force the jaws 9 and 10 to a closed position as denoted by the dotted lines 38 and 39 in Fig. 2. It should be noted that the jaws 9 and 10 may be made of different lengths to insure lapping at the ends to provide for close grip as also denoted by the dotted lines 38 and 39.

The jaws 9 and 10 may be constructed with integral teeth 40 as in jaw 10 or may have separate teeth riveted to them, or may be made with a plain gripping edge as shown in jaw 9.

The treadle 41 is suitably connected to the treadle arm 42 which is swivelly mounted on the bridge 61 which is formed by punching the holes 43 in the extension bar 44 which in turn is riveted to the base plate 1.

The treadle arm 42 is made with a slot 66 which admits of assembling over the bridge 61, the jaws being sprung together to form an eye. The treadle arm 42 is provided with a notch 62 which engages the trigger 45 which is provided with an eye 46 swivelly mounted in the extension bar 44.

It is to be especially noted that, instead of engaging the trigger 45 with one of the jaws of the trap, as is usual in the ordinary design of traps, an adjusting member 47 is swivelly mounted on the reinforcing arms 17 and 18 by means of the pins 48 fitting in the holes 49, of the member 47, as shown in Figs. 13 and 14. The adjusting member 47 is shown in detail in Figs. 12 and 13. The arm 65 of the adjusting member 47 engages the trigger 45 when the jaws 9 and 10 are in a three quarter open set position as shown in Figs. 1 and 7 and also by the full line jaws in Fig. 2. The tension of the springs 25, 28, and 31 tends to force the jaws 9 and 10 with the reinforcing arms 17 and 18 to a closed position, thus forcing the arm 65 upwardly against the trigger 45 which in turn holds the treadle 41 in a set position. The trap is now in a three quarter set position.

It is to be noted that, when the jaws 9 and 10 are in a three quarter open set position, the adjusting arm 50 has its shoulder 51 engaging the upper notch 52 of the turned up end 3 of the base plate 1. To set the jaws 9 and 10 in a half open position the adjusting arm 50 is placed in engagement with the upper notch 52 of the end 3 of base plate 1 and the jaw 9 is spread until the adjusting member 47 has its arm 53 beneath the trigger 45 as shown in Figs. 8 and 9. The trap is now in a half set position.

The adjusting arm 50 has a pin 54 swivelly mounted through the side arm of jaw 9 and has a hole 55 through which the side arm of the jaw 10 operates. The swivel mounting of the adjusting arm allows its enlarged end 56 to ride up the jaw 10 when the jaws are sprung together.

The shoulder 51 of the adjusting arm 50 may be placed in engagement with the lower notch 57 of the end 3 of the base plate 1, the adjusting member 47 being set as shown in Figs. 2 and 5, and this will spread the jaws to the extreme positions as shown in Fig. 6. This is the full set position of the trap.

When the adjusting member 47 is swung to the position as indicated by the dotted lines 63 in Fig. 4, the shoulder 58 will engage the under side of the extension arm 44, thus positively preventing the jaws 9 and 10 from closing until the adjusting member 47 is swung out from under the extension arm 44 as shown in Figs. 1, 2, and 5. This restores the ability of the treadle 41 to function as a release trip.

It is to be noted that my invention provides a trap that not only can be placed in one half, three quarter, and full set positions under normal conditions but also a trap that can be set in holes and runways either in a right side up or inverted positions. The trap is shown in an inverted position in Fig. 14, the trap proper being supported by the members 23 and 24. Also the trap may be used in a vertical position as shown on the side of a tree 59, in Fig. 5. The members 23 and 24 are fastened to the tree 59 by the staples 60, the members 23 and 24 being swung around to a reversed position from that shown in Fig. 14.

The ability of the trap to be used at the various set positions in an inverted way prevents any but the desired game to enter the trap. If set in a position where the jaws 9 and 10 are to operate vertically, the jaw 10 should be placed downward because the jaw 9 when released will travel over to the jaw 10, as shown by the dotted lines 64 in Fig. 2. This is a decidedly advantageous feature because the least pressure against the jaw 10, as an animal stepping thereon, will hold the jaw 10 stationary and the other jaw 9 will travel all the way over to the jaw 10, thus catching the animal. This is accomplished by the jaw 9 swivelling on the shaft 4 the jaw 10 being very sensitive to any load thereon, such as the pressure of the foot or body of an animal.

The trap can also be set at oblique angles by bracing the supporting arms 23 and 24 accordingly, one of the supporting arms 23 and 24 being made of a shorter length than the other, thus allowing either of them to trunnion around shaft 4 to any desired angle independently of the other of them.

I claim:

1. In an animal trap, the combination of a base plate having a pair of supporting lugs, a shaft supported in the lugs of said base plate, jaws pivotally mounted on said shaft, said jaws each being provided with a pair of reinforcing arms pivotally mounted on said shaft, each of said pairs of reinforcing arms being fixedly connected, at their outer ends, to said jaws, said pair of reinforcing arms being thereby enabled to move with said jaws, resilient means for closing said jaws, a bar pivotally mounted between the reinforcing arms of one of said jaws, means for holding said jaws in a set position, said means being engaged by said bar, and tripping mechanism for said last mentioned means.

2. In an animal trap comprising a base, the combination of a shaft suitably mounted on said base, jaws pivotally mounted on said shaft, each of said jaws being provided with reinforcing members pivotally mounted on said shaft, and fixedly connected, at their outer ends, to said jaws, means for closing said jaws, and means for locking said jaws in a set position, said means for locking said jaws being pivotally supported between the reinforcing members of one of said jaws.

3. In an animal trap comprising a trunnion shaft, a pair of jaws having side arms pivotally mounted on said shaft, each of said jaws being further provided with one or more intermediate arms pivotally mounted on said shaft, each of said intermediate arms being integrally connected, at their outer ends, to said jaws, said intermediate arms and said jaws being thereby constrained to pivotally move in the same direction and to the same angular extent.

4. In an animal trap, the combination of a base, a shaft mounted in said base, resiliently operated jaws pivotally mounted on said shaft, means for locking said jaws in a set position, means for releasing said jaws from a locked position, and a pair of supporting members pivotally mounted on said shaft, each of said supporting members being capable of being revolved independently around said shaft.

5. In an animal trap comprising a shaft having extensions beyond two sides of the trap, a pair of supporting arms pivotally mounted on said shaft, said supporting arms being capable of being revolved independently around said shaft.

6. In an animal trap comprising a shaft having extensions beyond two sides of the trap, the combination of a supporting arm having each of its ends pivotally mounted on the extensions of said shaft, said supporting arm having sufficient length to be revolved around said trap, and a supporting arm having each of its ends pivotally mounted on the extensions of said shaft, said last mentioned supporting arm having sufficient length to be revolved around said trap and said first mentioned supporting arm.

7. In an animal trap comprising resiliently operated jaws the combination of a base, a treadle pivotally mounted on said base, a trigger pivotally mounted on said base, said trigger engaging said treadle, and a member swivelly mounted on one of said jaws, said member engaging said trigger, said treadle being thereby held in a releasable position.

8. In an animal trap comprising a base, the combination of resiliently operated jaws mounted on said base, a treadle pivotally mounted on said base, a trigger pivotally mounted on said base, and a member swivelly mounted on one of said jaws, said member engaging said trigger to hold said treadle in a releasable position, said member having a plurality of shoulders for engaging said trigger.

9. In an animal trap, comprising a base, the combination of resiliently operated jaws mounted on said base, each of said jaws having a plurality of arms, means for locking said jaws in a releasable position, and a member mounted on two of the arms of one of said jaws, said member having a plurality of shoulders for engaging said locking means, when holding said jaws in a releasable position.

10. In an animal trap comprising resiliently operated jaws with locking means, each of said jaws having a pair of reinforcing arms, a member swivelly mounted on said pair of reinforcing arms of one of said jaws, said member having a plurality of shoulders for engaging said locking means.

11. In an animal trap comprising resiliently operated jaws with releasable locking means, means for indexing said jaws in a plurality of releasable positions, said means being provided with a closed side having a plurality of fingers extending therefrom, said means being swivelly mounted on one of said jaws in such manner as to enable said fingers of said means to engage said locking means.

12. In an animal trap comprising a base, the combination of a shaft mounted on said base, resiliently operated jaws mounted on said shaft, means for locking said jaws in releasable and non-releasable positions, and a member swivelly mounted on one of said jaws, said member being provided with a closed side having a plurality of fingers extending therefrom, one of said fingers engaging said locking means when said jaws are in a releasable position and one of said fingers engaging said base when said jaws are in a non-releasable position.

13. In an animal trap comprising a base, the combination of a shaft, a pair of resiliently operated jaws, mounted on said shaft, each of said jaws having reinforcing arms pivotally connected to said shaft, means for locking said jaws in a releasable position, and a member swivelly mounted on the reinforcing arms of said jaws, said member being provided with a plurality of shoulders for engaging said locking means.

14. In an animal trap comprising a base, the combination of resiliently operated jaws suitably mounted on said base, each of said jaws having a plurality of reinforcing arms pivotally connected to said shaft, means for locking said jaws in a releasable position, and means for adjusting said jaws to different set positions, said last mentioned means being mounted on the reinforcing arms of said jaws in such manner as to engage said locking means, said last mentioned means being further provided with a shoulder to engage said base and thereby lock said jaws in a non-releasable position.

15. In an animal trap, the combination of a base, said base being provided with a plurality of lugs, one of said lugs being provided with shoulders, a shaft mounted in the lugs of said base, resiliently operated jaws mounted on said shaft, and an index member pivotally mounted on one of said jaws, said index member having shoulders engaging the shoulders of the lug of said base and one of said jaws.

16. In an animal trap, comprising a base having lugs, one of said lugs being provided with shoulders, together with a pair of resiliently operated jaws mounted in said lugs an index member pivotally mounted on one of said jaws, said index member being provided with a shoulder for engaging the shoulders on the lug of said base when jaws are set, said index member being further adapted to engage the other of said jaws.

17. In an animal trap, the combination of a base, a shaft mounted on said base, a pair of jaws each having side arms pivotally mounted on said shaft, each of said jaws being further provided with reinforcing arms pivotally mounted on said shaft, each of said reinforcing arms being fixedly connected, at its outer ends, to said jaws, springs telescopically mounted on said shaft, each of said springs being interposed between arms of opposing jaws, each of said springs being further provided, at each end, with tangential extensions for engaging the arms of said jaws, and means for locking said jaws in a plurality of releasable positions, said means having a plurality of locking positions, each of said locking positions corresponding to one of the releasable positions of said jaws.

18. In an animal trap, the combination of a base, a shaft mounted on said base, a pair of jaws pivotally mounted on said shaft, springs mounted on said shaft between said jaws, said springs being connected at their ends to opposing jaws, a pair of supporting arms pivotally mounted on said shaft outside of said jaws, each of said supporting arms being revolvable around said shaft and said jaws, and means for locking said jaws in a releasable position.

19. In an animal trap comprising a base and a single shaft mounted therein, a pair of resiliently operated jaws, each of said jaws having a pair of outer arms pivotally mounted on said single shaft and a pair of inner arms secured, at their outer ends, to said pair of outer arms, all of said arms being pivotally connected, at their inner ends, to said single shaft, all of said arms thereby operating about a common center on said base.

20. In an animal trap comprising a base, the combination of a shaft, a pair of jaws mounted on said shaft, means for locking said jaws in a non-releasable open position and in a plurality of releasable open positions, said means being provided with a pivotally mounted member for selecting said open positions, said locking means being entirely contained within the maximum area circumscribed by said jaws in a set position, and resilient means for operating said jaws, said resilient means being entirely contained within the maximum area circumscribed by said jaws in a set position.

21. In a trapping mechanism, the combination of a shaft, a pair of U-shaped supporting arms pivotally mounted on said shaft, one of said arms being capable of being revolved within the other of said U-shaped arms, and an animal trap pivotally mounted on said shaft, said trap being capable of being revolved within said arms.

22. In an animal trap comprising a locking and release mechanism, the combination of a shaft, a pair of jaws pivotally mounted on said shaft, means for setting said pair of jaws in a plurality of positions, said means being pivotally mounted on one of said pair of jaws and adapted to engage said locking and release mechanism, and resilient means connecting the said jaws and said shaft, said resilient means being adapted to move one of said jaws to the other of said jaws, when one of said jaws is restrained in its set position.

23. In an animal trap, the combination of a base having a plurality of lugs, one of said lugs being provided with shoulders, a shaft mounted in the lugs of said base, a pair of jaws pivotally mounted on said shaft, said jaws being provided with reinforcing arms, resilient means for operating said jaws to a closed position, a treadle pivotally mounted on said base, a trigger mounted on said base, said trigger engaging said treadle, a locking member swivelly mounted on the reinforcing arms of one of said jaws, said locking member having a plurality of shoulders for engaging said trigger and one shoulder for engaging said base, and an adjusting arm pivotally mounted on one of said jaws, said adjusting arm having a shoulder adapted to engage the shoulders on one of said lugs on said base, said adjusting arm being further adapted to engage the other of said jaws.

24. In an animal trap, the combination of a base having a plurality of lugs, one of said lugs being provided with shoulders, a shaft mounted in the lugs of said base, a pair of resiliently operated jaws pivotally mounted on said shaft, means for locking one of said jaws in a releasable position, interengaging means between the said jaws, said interengaging means locking the other of the jaws in a releasable position, said interengaging means having a shoulder adapted to engage the shoulder on one of said lugs on said base, and means for releasing said jaws.

BERT COE.